United States Patent [19]
Park et al.

[11] Patent Number: 5,159,331
[45] Date of Patent: Oct. 27, 1992

[54] MISSING RADIO PAGE MESSAGE DETECTION

[75] Inventors: Michael C. Park, Portland; Henry A. Macchio, Lake Oswego, both of Oreg.

[73] Assignee: Seiko Corp. and Seiko Epson Corp., Japan

[21] Appl. No.: 534,207

[22] Filed: Jun. 6, 1990

[51] Int. Cl.$^5$ .................... H04J 15/00; H04Q 7/00
[52] U.S. Cl. .................. 340/825.440; 371/32; 371/69.1
[58] Field of Search .......... 340/825.44, 825.34; 455/32, 38; 379/57, 63; 371/32, 33, 69.1

[56] References Cited

U.S. PATENT DOCUMENTS

| | | | |
|---|---|---|---|
| 4,439,859 | 3/1984 | Donnan | 371/32 |
| 4,866,707 | 9/1989 | Marshall et al. | 371/32 |
| 4,975,952 | 12/1990 | Mabey et al. | 340/825.34 |
| 4,999,834 | 3/1991 | Leo et al. | 371/32 |

Primary Examiner—Donald J. Yusko
Assistant Examiner—Peter S. Weissman
Attorney, Agent, or Firm—Elmer Galbi

[57] ABSTRACT

A paging system transmits consecutively numbered page messages to receivers. Receivers detect missing page messages by interrogation of received page message numbers, and a missing page message is indicated by a gap in received page message numbers. However, page messages may be separated by long time intervals and a gap in received message numbers can not be detected until a subsequent page message is received. To more immediately detect a missing page message, a sequence message generated by the paging system provides a last transmitted page message number to receivers during otherwise unused portions of the transmission bandwidth. The receivers can thereby detect missing page messages without waiting until receiving a subsequent page message and without depleting the transmission bandwidth resource.

5 Claims, 6 Drawing Sheets

MISSING RADIO PAGE MESSAGE DETECTION

RELATED APPLICATIONS

The present application is directed toward an improvement of a missing message detection method described in co-pending U.S. patent application Ser. No. 07/435,315 filed Nov. 13, 1989 and in co-pending U.S. patent application Ser. No. 07/381,442 filed Jul. 18, 1989 and now abandoned. The subject matter of application Ser. Nos. 07/435,315 and 07/381,442 and that of the present application were commonly owned at the time of invention. The disclosures of application Ser. Nos. 07/435,315 and 07/381,442 are incorporated herein by reference.

FIELD OF THE INVENTION

The present invention relates generally to communication systems and particularly to paging systems where messages are transmitted to a remote receiver.

BACKGROUND OF THE INVENTION

Radio paging systems that are in widespread use collect page messages from page requesting users and direct the page messages to remote receiving devices carried by page receiving users. It is desirable that the remote receivers reliably receive page messages, but due to a variety of factors including environmental conditions, every page message transmitted will not be received.

In some systems page messages are re-transmitted to improve the probability of their receipt. However, such retransmission of page messages burdens a valuable communication resource, namely, the transmission path bandwidth. Each re-transmission requires a portion of the transmission bandwidth which could be otherwise used for first transmission of other page messages. A second problem associated with re-transmission of page messages is that the person receiving the message does not know when the message was originally transmitted. It is misleading to receive an urgent message "call home" when the message was originally transmitted hours before receipt. While a time stamp can be transmitted with a message to indicate time of first transmission, this requires a significant portion of the bandwidth and typically is not necessary as most messages are received within minutes of first transmission. Accordingly, it is considered most efficient to simply inform the receiver of a missing message condition.

If the fact that one has missed a page message can be detected, the user can take corrective or remedial action. The prior referenced applications describe a missing page message detection system that indicates a missing page message to the page receiving user. The page receiving user can then recover the missing page message by telephone contact with the paging system.

In the missing page detection method described in the above referenced co-pending and commonly owned applications, each page message transmitted to a given receiver carries a consecutive message number. Each receiver interrogates message numbers as messages are received to detect and identify a missing page message as a gap in the message number sequence. The page message numbers also allow the receiver to distinguish new page messages from previously received page messages. This method reliably detects missing page messages, however, it requires receipt of a later page message. Page messages may be separated by hours, and sometimes days. Accordingly, a missing page message may not be detected until hours, and possibly days, after its transmission.

It would be desirable to provide a missing page message detection method which more quickly indicates a missing page message, without burdening the valuable transmission path resource.

SUMMARY OF THE INVENTION

The present invention is used in a paging system transmitting consecutively numbered page messages to receivers adapted to detect missing messages by interrogation of received message numbers. Each receiver maintains a last received number corresponding to the message number of the last received page message. The paging system transmits to a selected receiver a sequence message during otherwise unused portions of the transmission path bandwidth. The sequence message includes a last transmitted number corresponding to the last page message transmitted to the selected receiver. Upon receiving a sequence message, the receiver compares a last received number with the last transmitted number of the received sequence message to detect a missing page message.

In accordance with the present invention, the system allows the receivers to more immediately detect missing page messages without burdening the transmission path bandwidth.

DETAILED DESCRIPTION OF A PREFERRED EMBODIMENT

The present invention will be described with reference to a paging system (hereafter the "Gaskill system") described in U.S. Pat. Nos. 4,713,808 and 4,897,835 issued Dec. 15, 1987 and Jan. 30, 1990, respectively. The disclosures of U.S. Pat. Nos. 4,713,808 and 4,897,835 are incorporated herein by reference.

Figure 1:
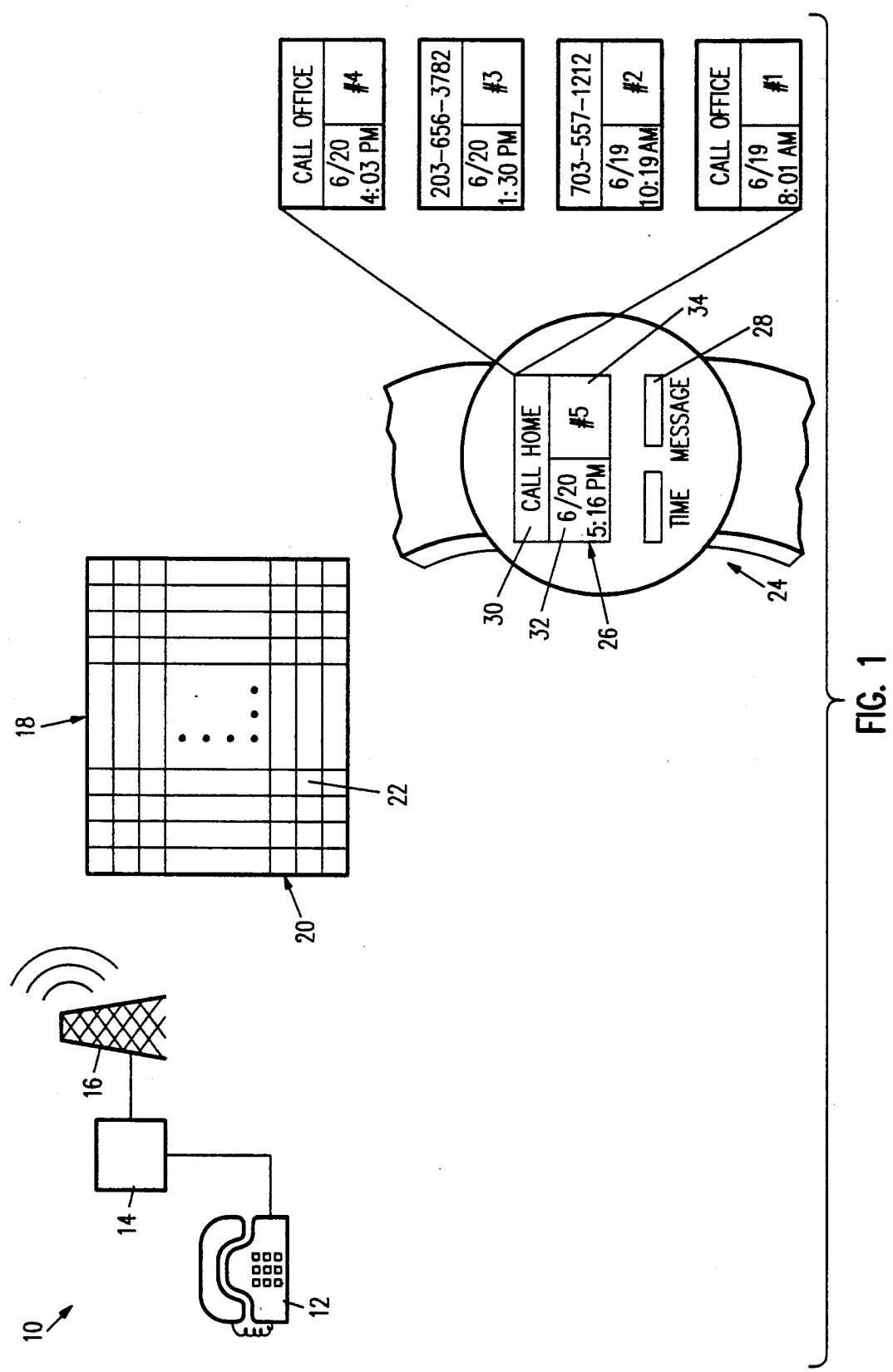
FIG. 1 illustrates a paging system in accordance with the present invention providing page messages to selected receivers according to a time slot protocol wherein page messages are consecutively numbered and receivers monitor the system transmission to detect missing page messages.

With reference to FIG. 1, the Gaskill system 10 receives page messages from page requesting users by way of telephone system 12 Clearinghouse 14 formats the page messages for transmission by way of transmission facilities 16. Clearing house 14 transmits successive frames 18 of paging information to remote receivers in accordance with a time slot protocol. The frames 18 are divided into subframes 20 and subframes 20 are divided into time slots 22. Each receiver 24 in the Gaskill system 10 is associated with at least one time slot 22 and is programmed to monitor and capture a message packet transmitted during its associated time slot 22. The Gaskill system 10 must receive page messages from page requesting users, identify the time slot 22 associated with the desired receiver 24, and transmit as a message packet the page message during the associated time slot 22. Each message may be broadcast a fixed number of times to improve its probability of receipt. For example, a given page message might be broadcast in similar time slots of three successive frames 18.

Each receiver 24 stores the most recent page messages received. Each receiver 24 includes a display 26 for viewing stored messages and a control button 28 for operation of stored message recall and viewing procedures. Each page message held by a receiver 24 includes a message data field 30, a time and date received field 32, and a message number field 34. By operation of button 28 the user of receiver 24 can display the page messages stored in receiver 24. For example, when in time display mode, pressing button 28 displays the most recently received page message. A subsequent press and hold of button 28 displays the time and date field 32 and the message number field 34 associated with the most recently received page message. Upon release of button 28 the next most recently received page message is displayed, and by then pressing and holding button 28 the fields 32 and 34 associated with the next most recently received page message are displayed. In this manner the user can display all page messages stored in receiver 24.

For the receiver 24 shown in FIG. 1 the five most recent page messages received are illustrated. The time and date fields 32 of the messages shown in FIG. 1 are typical in that page messages are usually separated by long intervals. Page messages are often separated by hours, and, as in the case of messages numbered 2 and 3 in FIG. 1, are sometimes separated by more than one day.

According to one method of missing page message detection, disclosed and claimed in co-pending United Stated patent application Ser. No. 07/435,315 and patent application Ser. Nos. 07/381,442, each page message directed to a given receiver 24 carries a message number. Each receiver 24 interrogates the message number sequence to detect and identify a missing page message number as a gap in the message number sequence. The page message numbers also allow the receiver to distinguish new page messages from previously transmitted and received page messages.

According to this method, receivers 24 are programmed to examine the message number field 34 of received page messages and, upon detecting a gap in the message number sequence, indicate to its user a missing page message condition. The user can then contact the paging system by telephone and identify the missing page message by number for retrieval. This is a reliable method of detecting missing page messages, however, it requires receipt of a later page message. For example, a temporary environmental condition of receiver 24 might prevent receipt by receiver 24 of message number 2. Receiver 24 would be unable to detect this condition at least until transmission and receipt of message number 3. In this example, the user would be unaware of the missing page message until more than one day after its transmission.

In accordance with the present invention, however, receiver 24 more immediately detects a missing page message. The paging system 10 identifies otherwise unused portions of the transmission bandwidth, e.g. unused time slots 22, and generates for transmission to selected receivers 24, i.e. receivers 24 associated with the identified unused portions of the transmission bandwidth, a sequence message indicating a last message transmitted number. Receivers 24 thereby use the sequence message to detect missing page messages. Receivers 24 need not wait until transmission and receipt of a later page message to detect a missing page message condition. The transmission bandwidth remains fully available for normal transmission of page messages, but can be efficiently used to provide sequence messages.

As used herein and in the appended claims, the terms "page message" and "sequence message" shall be generally distinguished as follows. Page message refers to a message directed to the user of a receiver in the paging system, e.g., a message originating from a page requesting user and provided via the paging system to a page receiving user. A sequence message is generated by the paging system and provides sequence information for interpretation by a receiver of the paging system, e.g., a sequence message providing a last transmitted number to a receiver for the purpose of detecting a missing message.

Figure 2:
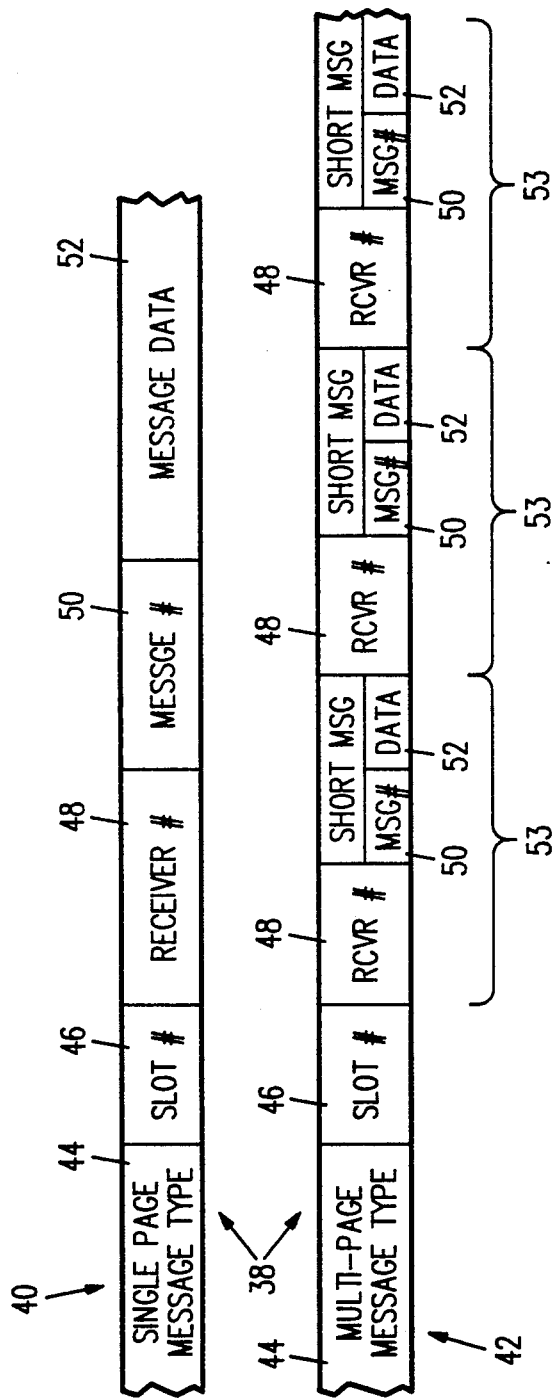
FIG. 2 illustrates two message formats used in the paging system of FIG. 1.

Referring now to FIG. 2, Gaskill system message packets 38 transmitted during each time slot 22 ma take alternate formats. The message packet 38 formats as shown in FIG. 2 are for the purpose of succinct illustration of the present invention. The actual message packet 38 formats may include additional fields, control information, and error correction codes. A long message packet format 40 is used to direct a long page message, i.e. a sixteen digit telephone number, to a selected receiver 24. A short message packet format 42 is used to direct multiple short messages, i.e. coded messages, to several receivers 24 sharing association with one time slot 22. Each of formats 40 and 42 include a message type field 44 specifying the message format, e.g., format 40 or 42, whereby a receiver 24 properly interprets the content of a message packet 38. A second field of formats 40 and 42 is a slot number field 46 used by receivers 24 to determine the time slot 22 in which a received message was transmitted.

Page messages are further represented in both formats 40 and 42 as a set of three field items: a receiver field 48, a message number field 50, and a message data field 52. Format 40, due to the length of message data field 52 holds a single page message for a selected receiver 24, i.e., holds one set of the fields 48, 50 and 52. Format 42, due to the brevity of field 52, contains three messages for up to three selected receivers 24, i.e. contains three sets of fields 48, 50 and 52. Thus, format 42 provides three subslots 53 each containing a receiver field 48, a message number field 50, and a message data field 52.

In accordance with the Gaskill system 10 protocol, upon capturing a message packet 38, a receiver 24 first reads type field 44 to properly interpret the message packet 38 content. The slot number field 46 must identify the time slot associated with the receiver, i.e., the time slot during which receiver 24 is to monitor system transmissions. The receiver field 48 must match a certain portion of the receiver 24 serial number. When a given receiver 24 finds the proper slot number field 46 and receiver field 48, the given receiver 24 accepts the message data field 52 as a "message for me." In this manner multiple receivers 24 can share one time slot 22, but reliably extract their page messages.

Figure 3:
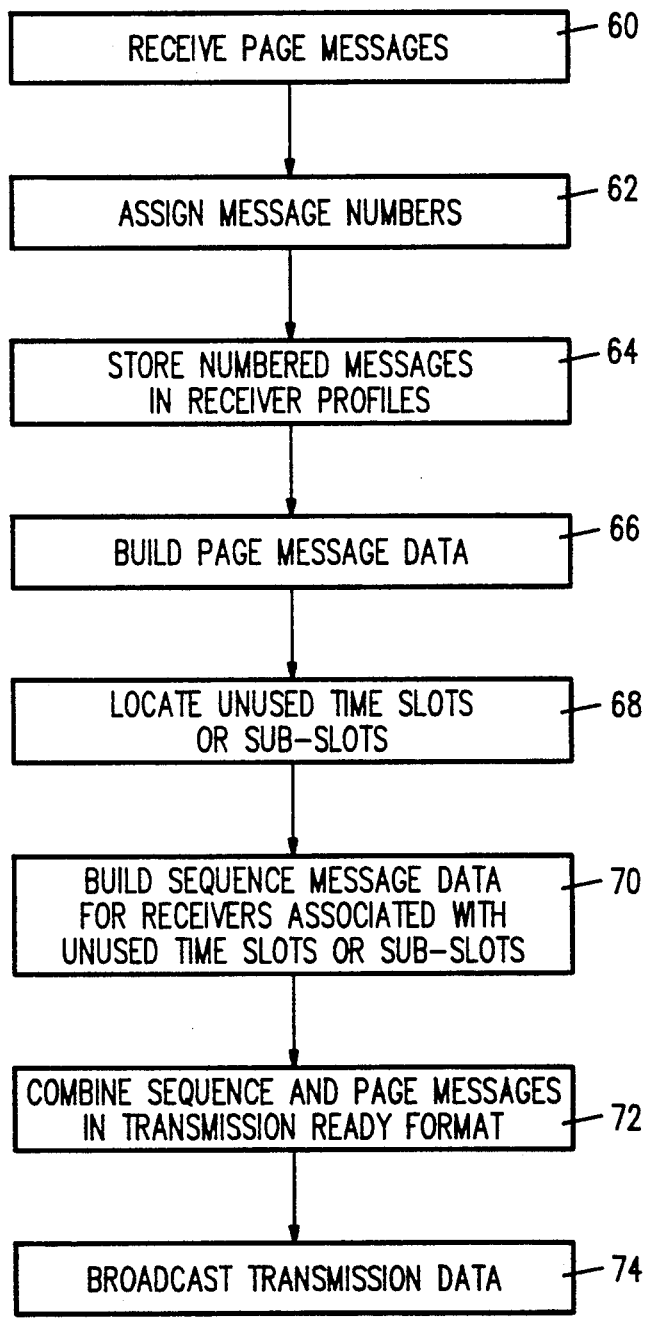
FIG. 3 is a flow chart illustrating steps used by the paging system of FIG. 1 to transmit page messages and sequence messages.

FIG. 3 illustrates steps executed by the Gaskill system 10 in receiving page messages, generating sequence messages, and transmitting such messages to receivers 24. Block 60 represents steps within clearinghouse 14 (FIG. 1) associated with receiving page messages from page requesting users by way of telephone system 12. Clearinghouse 14 assigns in block 62 a message number to each page message received. A sequence of page messages directed to a given receiver 24 will have consecutive message numbers. In block 64 the page messages, as consecutively numbered, are stored in a receiver profile containing information for each receiver 24.

As page messages are received clearinghouse 14 determines the time slot 22 associated with the intended receiver 24. In block 66 clearinghouse 14 builds page message data in accordance with the Gaskill system 10 time slot protocol. A given page message is typically scheduled for transmission in three successive frames 18. Clearinghouse 14 prepares each frame 18 for transmission by placing page messages in the time slot 22 associated with the intended receiver 24. Having prepared a frame 18, certain time slots 22, or subslots 53 as in the case of format 42, will be unused. As indicated by block 68, clearinghouse 14 identifies such unused portions of the frame 18 for use in transmitting sequence messages to selected receivers. Thus, in block 70 clearinghouse 14 identifies receivers associated with unused portions of the frame 18 and accesses the receiver profile data to obtain the message number of the page message last transmitted to the identified receivers. Sequence messages containing such last transmitted numbers are then generated and placed in the otherwise unused portions of frame 18.

In block 72 clearinghouse 14 combines the page message data and the sequence message data in transmission ready format. Such formatting includes, for example, insertion of control and error correction information. Clearinghouse 14 then provides in block 74 the transmission ready data to transmission facilities 16 whereupon the page and sequence messages are provided by radio signal to the receivers 24 of system 10.

It is proposed in the preferred embodiment of the present invention that sequence messages be broadcast in message format 42. The coded message data field 52 of format 42 would identify a given message as a sequence message, as distinguished from a page message, for suitable processing by receivers 24. Accordingly, the message number field 50 for a sequence message would carry the message number of the last message transmitted to the receiver to which the sequence message is directed.

Figure 4:
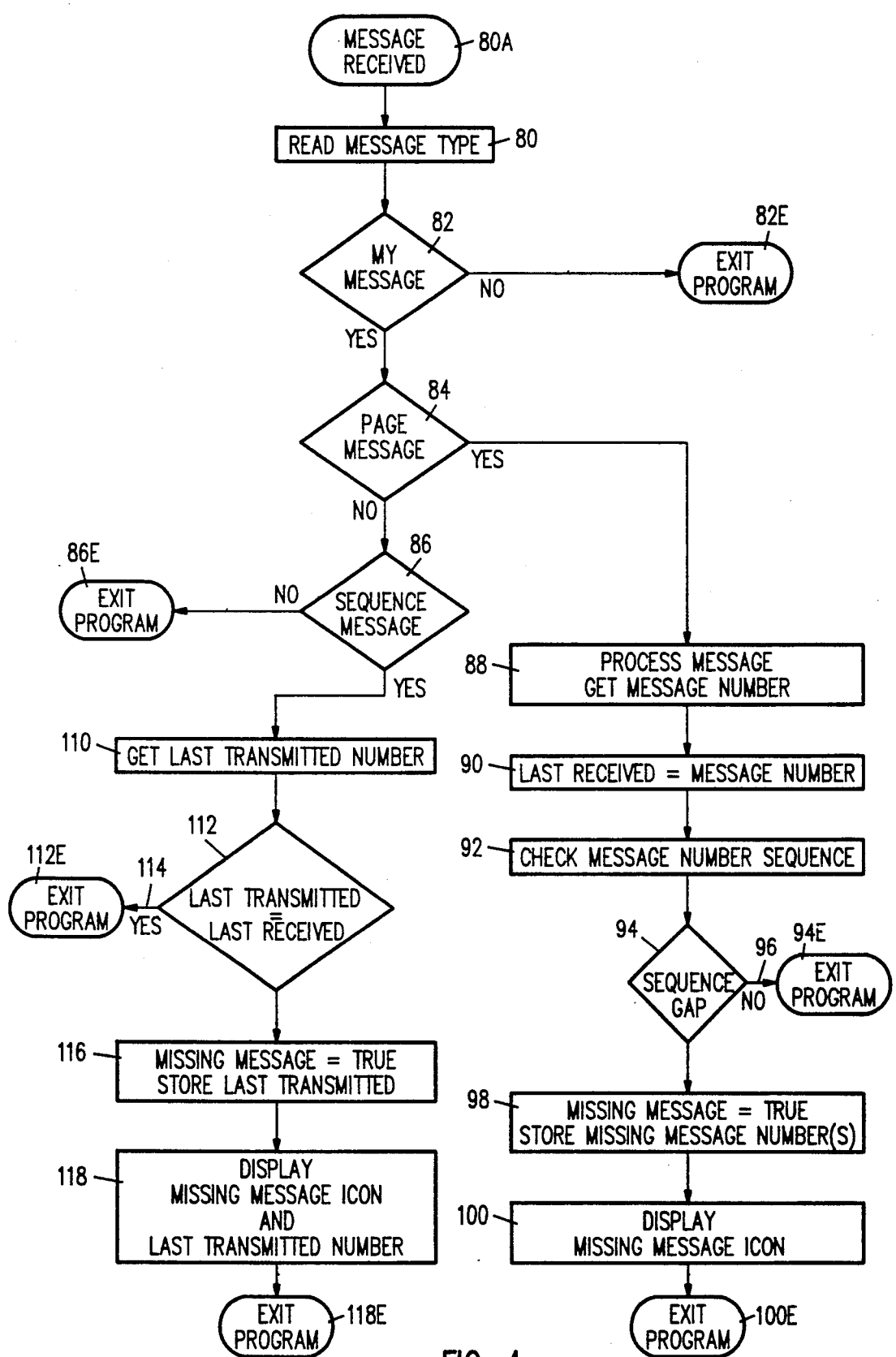
FIG. 4 is a flow chart illustrating steps used by receivers of the system of FIG. 1 for processing page messages and sequence messages to detect missing page messages.

FIG. 4 illustrates message received steps within a receiver 24 of system 10 for distinguishing between page messages and sequence messages and suitable processing thereof. Assuming a message packet 38 has been successfully captured, as indicated by block 80A receiver 24 first examines in block 80 the message type field 44. Given the message packet format, the receiver 24 interrogates in block 82 the packet 38 to determine whether the packet 38 captured is a "message for me." Decision block 84 determines whether the message is a page message, and decision block 86 determines whether the message is a sequence message. Thus, blocks 84 and 86 distinguish page messages and sequence messages and branch processing accordingly.

If in block 84 receiver 24 determines that the capture message is a page message, processing branches to block 88 where receiver 24 recovers the message number field 50. Also in block 88 receiver 24 processes the message data field 52 as necessary for normal paging operations including display of the page message and, if in alarm mode, actuation of an audible alarm. Continuing to block 90, receiver 24 then assigns the contents of message number field 50 to a LAST RECEIVED variable maintained for the purpose of storing the message number of the last received page message. In block 92, receiver 24 interrogates the sequence of message numbers of stored page messages. Continuing to decision block 94, if the sequence of message numbers is consecutive, i.e. no gaps, processing branches at non-error path 96, but if a gap is detected processing branches to block 98. In block 98, a variable MISSING MESSAGE is set to true, indicating a missing message condition, and the number, or numbers, of missing page messages are stored for future reference. Receiver 24 then displays in block 100 a flashing missing message icon 101 (FIG. 6) to indicate the missing message condition. It is noted that blocks 82E, 86E, 112E, 94E, 118E and 100E represent exits from the program.

Figure 7:
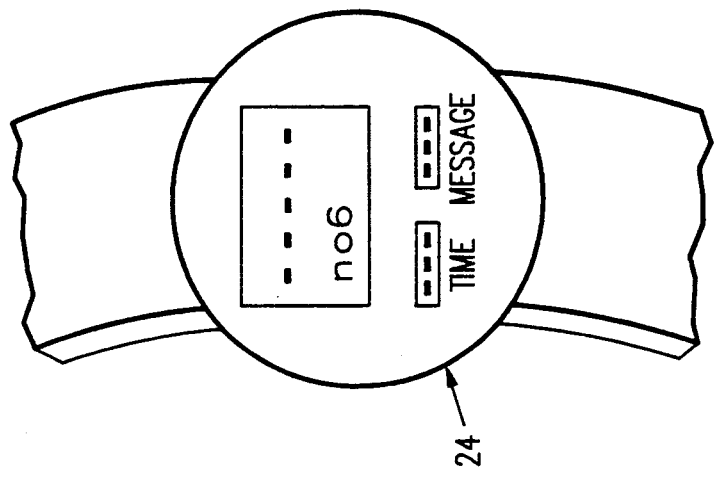
FIG. 7 illustrates a missing message display.
Figure 6:
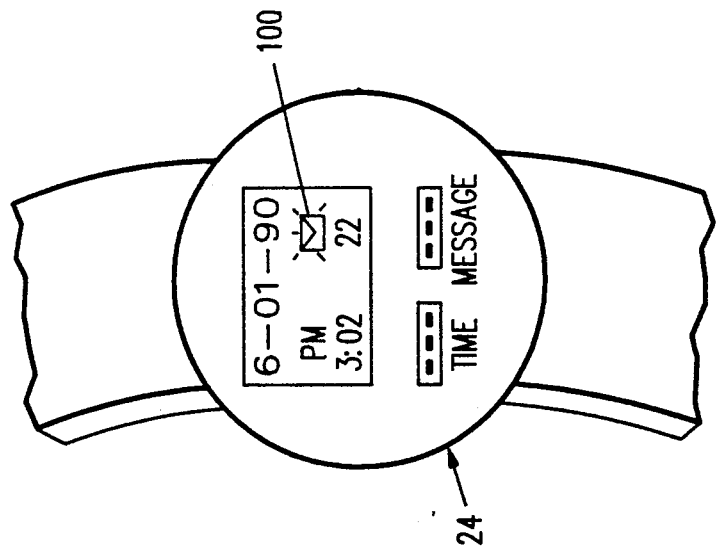
FIG. 6 illustrates a receiver in time display mode, but indicating a missing message condition.

With reference to FIG. 6 in conjunction with FIG. 4, the user acknowledges the new page message by pressing button 28 to remove the new page message display and return to normal time display mode (as shown in FIG. 6). Receiver 24, detecting the state of variable MISSING MESSAGE as true, will continue to display the flashing missing message icon 101. Receiver 24 can be programmed to display missing message numbers in any desired manner. For example, the user can access stored missing message numbers by holding down button 28 for a given time interval. In response, receiver 24 presents missing page messages in the format illustrated in FIG. 7 where, for each stored missing page message number, the missing page message number is displayed adjacent a series of dash characters. Successive ones of the stored missing page message numbers are displayed in this manner by successive activation of button 28. Pressing time button 103 returns receiver 24 to the normal time display mode. Once a missing message number has been reviewed by the user, the variable MISSING MESSAGE can, if desired, be set to false whereby the flashing missing message icon 101 is removed from display 26.

Returning to block 86 if receiver 24 determines that the message received is a sequence message, processing branches to block 110 where receiver 24 obtains the last message transmitted number from the sequence message. In decision block 112, receiver 24 compares the obtained last transmitted number to the variable LAST RECEIVED. If the contents of the LAST RECEIVED variable match the obtained last transmitted message number, then processing branches at non-error path 114. If the contents of LAST RECEIVED do not correspond to the obtained last message transmitted number, an error condition is indicated and processing continues to block 116. In block 116, receiver 24 sets the variable MISSING MESSAGE to true and stores the obtained last transmitted message as a missing page message number. Receiver 24 can also interrogate the sequence of stored message numbers with reference to the obtained last message transmitted number to identify and store other missing messages. More particularly, if the difference between LAST RECEIVED and the obtained last transmitted number is greater than one, more than one page message was missed. In block 118 receiver 24 displays the flashing missing message icon 101 and the last transmitted number as a missing message number in the format of FIG. 7. Any other missing page messages detected but not yet displayed can be displayed in the manner described above.

Thus, receiver 24 distinguishes between page messages and sequence messages to identify missing message numbers and alert the user of a missing message condition. The user is likely to be informed of a missing message more quickly than if the receiver 24 had to wait until receiving a next page message. Also, because the sequence messages are transmitted during otherwise unused portions of the transmission bandwidth, the method of missing page message detection according to the present invention places no extra burden on the valuable transmission bandwidth.

Figure 5:
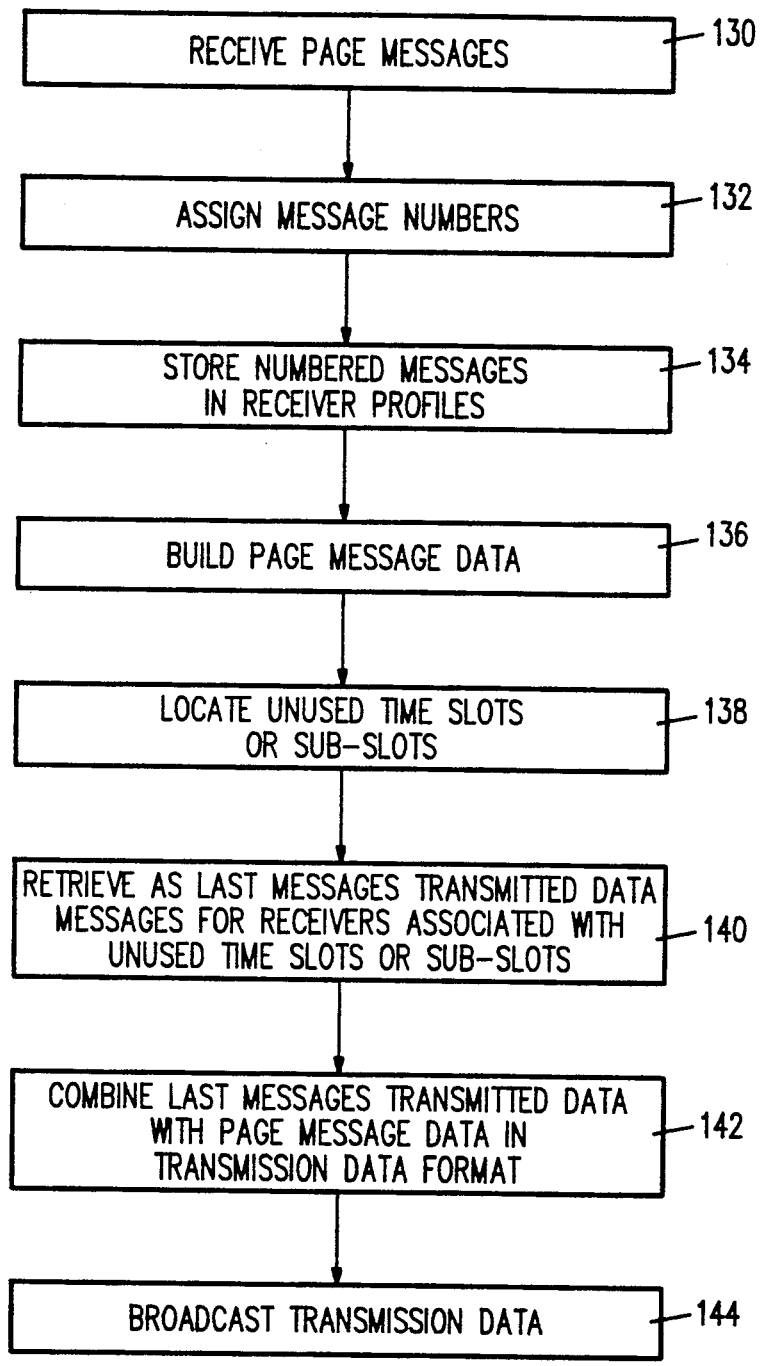
FIG. 5 is a flow chart illustrating steps used in the system of FIG. 1 according to an alternate method of detecting missing page messages.

FIG. 5 illustrates clearinghouse 14 steps of an alternate method of missing message detection and recovery. In FIG. 5, clearinghouse 14 receives page messages in block 130 and assigns message numbers in block 132. In block 134 clearinghouse 14 stores the numbered page messages in the receiver profiles. Clearinghouse 14 then builds in block 136 the page message data as a frame 18 by assigning each page message to the time slot 22, or sub-slot 53 as in the case of message format 42, associated with the intended receiver. Then in block 138 clearinghouse 14 identifies unused portions of the frame 18, i.e., unused time slots 22 or sub-slots 53. In block 140, clearinghouse 14 recovers page messages for receivers associated with the unused portions of frame 18. Clearinghouse 14, in block 142, combines the previously transmitted messages with the normal page messages in the transmission data format for broadcast in block 144 by facility 16.

In accordance with the alternate method of FIG. 5, a clearinghouse 14 uses otherwise unused portions of the transmission bandwidth to re-transmit complete page messages. A receiver 24 thereby receives the actual page message for user display.

Thus, an improved missing message detection system has been shown and illustrated. The system of the present invention efficiently provides missing message information to receivers whereby page receiving users are aware of a missing page message condition without waiting until receipt of a next page message. The method of the present invention makes use of otherwise unused portions of the transmission bandwidth and thereby avoids hardship on the valuable transmission bandwidth resource.

Having described and illustrated the principles of the present invention, it should be apparent to those skilled in the art that the invention may be modified in arrangement and detail without departing from such principles. Thus, while shown and described in the context of the Gaskill system, the present invention may be used in other communication systems where detection of missing messages is desirable. We claim all such modifications coming within the scope of the following claims.

We claim:

1. In a paging system transmitting consecutively numbered page messages which include paging information to a selected receiver adapted to detect missing messages by interrogation of received message numbers,, an improved method of detecting at said receiver missing transmitting page messages comprising:

maintaining at said receiver a first number corresponding to the message number of the last receiver page message;

transmitting to said receiver and receiving at said receiver a sequence message, which is in addition to the normally transmitted information bearing page messages said sequence message including a second number corresponding to the last page message transmitted to said receiver; and upon receiving a sequence message, comparing at said receiver the first number with the second number of the received sequence message, a difference in said numbers indicating a missing page message.

2. In a paging system, a method of detecting missed messages comprising:

receiving a plurality of page messages for a selected receiver;

inserting into each of said page messages a message number corresponding to a position in an ordered transmission sequence;

transmitting to said selected receiver said plurality of page messages in said ordered transmission sequence;

maintaining a last transmitted number corresponding to the message number of the most recent page message transmitted to said selected receiver;

transmitting to said selected receiver a plurality of sequence messages each containing said last transmitted number;

receiving page messages at said selected receiver;

maintaining within said receiver a last received number corresponding to the message number of the page message most recently received;

receiving sequence messages at said receiver;

comparing said last received number maintained by said receiver to the last transmitted number of each received sequence message; and detecting within said receiver a missed message when the compared last received number fails to correspond to the compared last transmitted number.

3. The system according to claim 2 wherein transmitting said plurality of sequence messages is intermingled with transmitting of said page messages.

4. The system according to claim 2 wherein said sequence messages are transmitted in otherwise unused portions of a transmission bandwidth.

5. In a paging system for directing page messages which include page information to a plurality of receivers by transmission facilities providing successive message frames each comprising a plurality of time slots wherein each receiver is associated with a time slot, page messages for each receiver are transmitted during the associated time slot, and page messages directed to each receiver are consecutively numbered whereby each receiver detects missing page messages by interrogation of received page message numbers, an improved method of detecting missing page messages comprising:

associating at said transmission facility a last transmitted number with a given receiver, the last transmitted number corresponding to the message number of the last message transmitted to said given receiver;

detecting at said transmission facility an unused time slot associated with said given receiver;

transmitting to said given receiver a sequence message which does not include any of said page information during said unused time slot, said sequence message including the last transmitted number associated with said given receiver;

maintaining at said given receiver a last received number corresponding to the last received page message number;

comparing at said given receiver the maintained last received number to the last transmitted number of a received sequence message;

whereby if a difference is detected by said comparing step it indicates a missing page message.

* * * * *